United States Patent [19]
Carpenter et al.

[11] 3,789,201
[45] Jan. 29, 1974

[54] SIMULATED LOAD FORECAST AND CONTROL APPARATUS

[75] Inventors: Edward J. Carpenter, Lynnwood; Warren L. Leyde, Seattle, both of Wash.

[73] Assignee: Pacific Technology, Inc., Renton, Wash.

[22] Filed: May 18, 1972

[21] Appl. No.: 254,388

[52] U.S. Cl............................. 235/151.21, 324/103
[51] Int. Cl........................ G06f 15/56, G05b 15/02
[58] Field of Search ... 235/151.21, 151.31; 324/103

[56] References Cited
UNITED STATES PATENTS

| | | | |
|---|---|---|---|
| 3,505,508 | 4/1970 | Leyde | 235/151.31 |
| 3,602,703 | 8/1971 | Polenz | 235/151.21 |
| 3,387,121 | 6/1968 | Maczuzak et al. | 235/151.21 |
| 3,522,421 | 8/1970 | Miller | 235/151.21 |
| 3,652,838 | 3/1972 | Dillon et al. | 235/151.21 X |

*Primary Examiner*—Eugene G. Botz
*Assistant Examiner*—Edward J. Wise
*Attorney, Agent, or Firm*—Christensen

[57] ABSTRACT

In order to observe the effect of adding or shedding a load upon the total energy consumed during a billing period and, if desired, to effect such an add or shed operation, simulation and control apparatus is provided for use in conjunction with a power demand monitor and limiter. The power demand monitor and limiter, which is prior art apparatus, contains at all times an account of the time consumed during a billing period, the energy consumed to that time, and the current rate of energy consumption. This information is utilized by an incremental control unit which also accepts information representing the size of each individual load in a system, which information is utilized to affect the rate of oscillation of a simulated load oscillator. When a forecast is to be made of the effect of adding or shedding a load, the information from the power demand monitor and limiter is utilized to simulate the remaining time in the period at a very fast rate while simultaneously simulating the effect of adding or shedding the load contemplated in exactly the same accelerated rate. The forecast results are contained in an accumulator which may drive a display unit for the benefit of an operator observing the simulation. Additionally, set point switches and count comparison logic provides the optional ability to actually add or shed the load at an optimum point in time during the billing period to avoid exceeding the consumption limit while approaching such limit as closely as possible.

11 Claims, 5 Drawing Figures

SIMULATED LOAD FORECAST AND CONTROL APPARATUS

This invention relates to the electrical load control arts, and, more particularly, to apparatus for forecasting the effect of adding or shedding a load during a billing period on the total consumption of power during the billing period.

In those industries requiring vast amounts of electrical energy, an accommodation must be reached between power company and the user on the total amount of energy consumed during a specific billing period in order that the utility will be able to meet peak demand of both the heavy industrial user and the rest of its customers. Such accommodation usually constitutes an agreement that a certain amount of energy will be consumed at a basic cost during a billing period (typically thirty minutes), and if more than the agreed upon amount of energy is consumed during a billing period, the heavy industrial user must pay a substantial "penalty" of increased rate. Thus, it is advantageous to the heavy industrial consumer to approach the agreed upon limit as closely as possible to realize maximum benefit from the non-penalized rate, and this optimum operating condition is also advantageous to the utility which can better accommodate its total systems need if it can depend upon the energy consumption of a heavy industrial user during a given period.

Apparatus for monitoring the electrical energy being consumed by a heavy industrial user and for providing continuously updated forecasts of the total consumption based on past useage, rate of useage, and time to go until the end of a given power demand interval have proven to be useful and are known in the art. Reference to such a system may be taken to United States Pat. No. 3,505,508, issued Apr. 7, 1970, to Warren L. Leyde and assigned to the Assignor of the present invention.

However, many heavy industrial systems utilize a plurality of loads, and it may be necessary to add or shed a load during a demand interval to closely approach the agreed upon power consumption level during the interval. The problem then arises as to what is the optimum time to add or shed the load. Thus, it will be apparent to those skilled in the art that apparatus which provides an accurate forecast based not only on the above-stated parameters but also on a variable representing a shed or add load would be highly valuable in such systems, particularly if the actual function could be carried out at the optimum point in time during the demand interval.

It is therefore a broad object of this invention to provide improved apparatus for forecasting the total amount of electrical energy of which will be consumed during the demand interval in progress.

It is a more specific object of this invention to provide such apparatus which selectively takes into account the effect of adding or shedding a load.

Another aspect, it is a further object of this invention to provide such apparatus which makes such forecasts repetitively and may be provided with means for detecting the optimum time for adding or shedding a load and means for responding to such detection by instituting the actual load adjustment operation.

The subject matter of the invention is particularly pointed out and distinctly claimed in the concluding portion of the specification. The invention, however, both as to organization and method of operation, may best be understood by reference to the following description taken in conjunction with the accompanying drawing of which:

Figure 1:
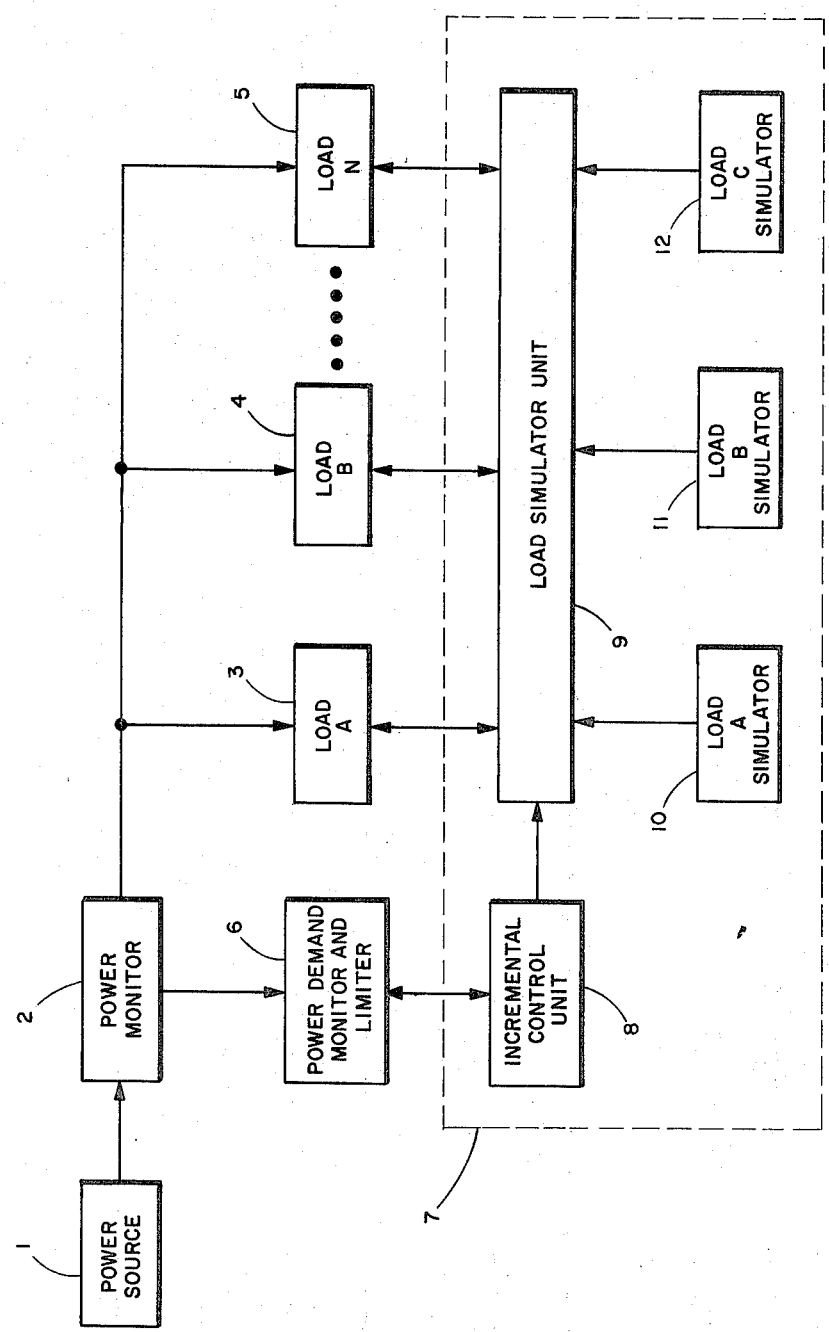
FIG. 1 is a major block diagram of an exemplary system incorporating the apparatus of the present invention.

Referring now to FIG. 1, it will be observed that electrical energy from a power source 1 passes through a power monitor 2 as it is delivered to one or more loads such as Load A 3, Load B 4, and Load n 5. The power monitor 2 records the power consummated during a predetermined base time period for billing purposes and also issues pulses to a power demand monitor and limiter 6 (henceforth PDM&L) at a rate proportional to the rate of electrical energy consummation. Additionally, the power monitor 2 designates the beginning of a billing period by issuing a reset pulse to the PDM&L 6. The PDM&L 6, as will be explained more fully below, performs the basic function of monitoring the number of power units which have been used during a billing period and, in addition, has the capability of forecasting the total impulse count at the end of the period based on the accumulated impulse count and the rate of energy consummation at the time of interrogation. The incremental controller 7, which includes an incremental control unit 8 (henceforth ICU) and a load simulator unit 9 (henceforth LSU), operate in conjunction with the PDM&L 6 to simulate the effect on the forecast of adding or shedding a load. Additionally, commands to actually add or shed a load may be generated at an optimum time to provide automatic load control. Load simulators 10, 11, and 12 are each preset in accordance with the size of the corresponding load in an individual installation to provide simulation information to the load simulator unit 9.

Figure 2:
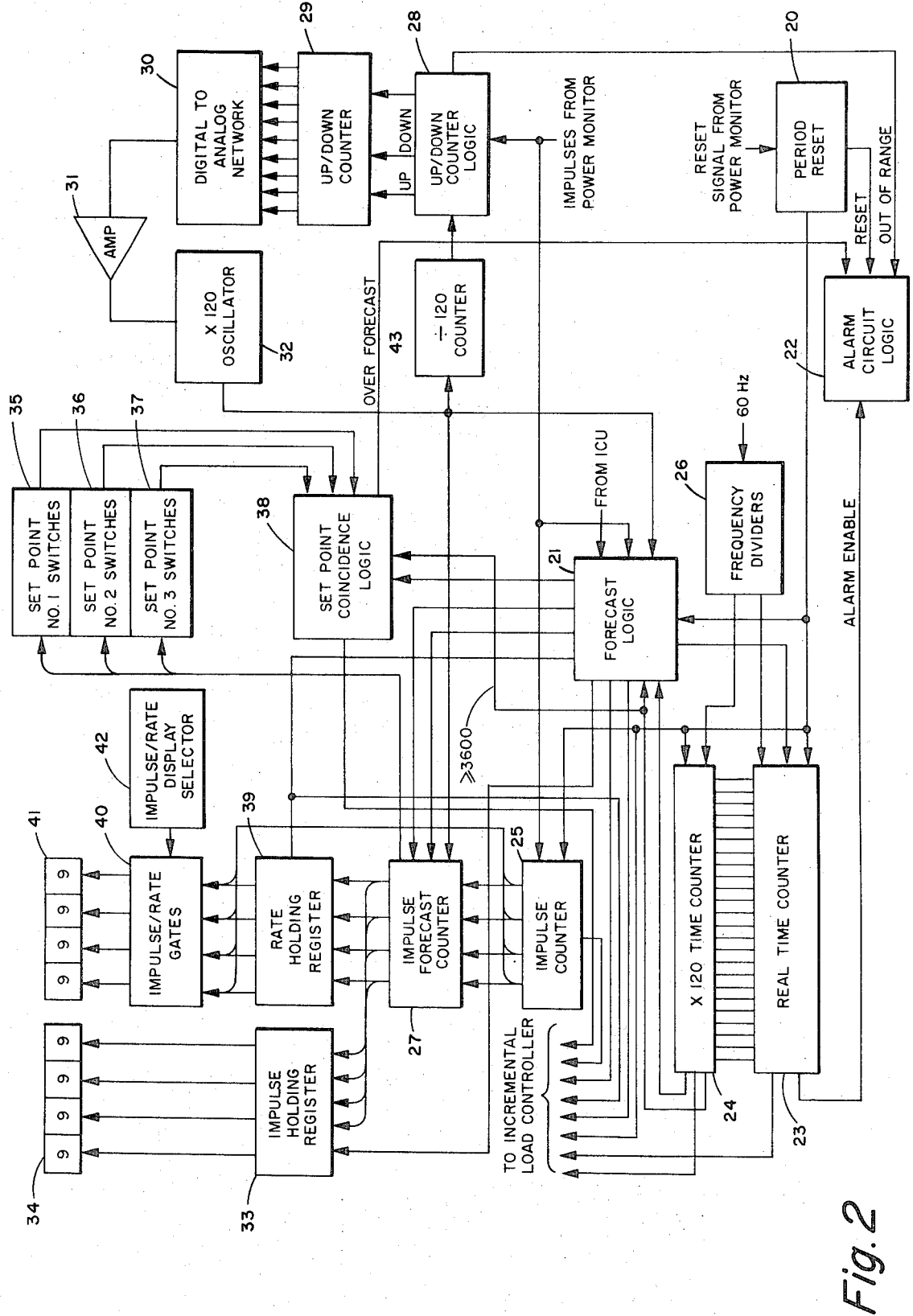
FIG. 2 is a block diagram of a power demand monitor and limiter included in the system.

PDM&L 6, shown in block diagram form in FIG. 2, is described in detail in U. S. Pat. No. 3,505,508 by W. L. Ledye, issued Apr. 7, 1970, and assigned to the Assignee of the instant invention. The PDM&L illustrated in FIG. 2 very closely resembles that disclosed and claimed in the above referenced patent; however, in order to provide a unitary system description, a detailed explanation of the apparatus of FIG. 2 follows.

The reset signal from the power monitor 2 is applied to period reset logic 20 for distribution throughout the PDM&L 6. Thus, the forecast logic 21 and the alarm circuit logic 22 receive a reset signal, and the real time counter 23, the X 120 counter 24 and the impulse counter 25 are all cleared to set up an initial condition at the beginning of a billing time period. Impulses from the power monitor 2 then begin to accumulate in the impulse counter 25. The X 120 counter is driven by the output from a frequency divider 26 which receives timing pulses from the 60 hz line. Similarly, the real time counter 23 is driven by a different output from the frequency divider 26 to accumulate a total, for example, of 3,600 counts corresponding to the billing period of the system. It will be understood that the X 120 counter 24 is being pulsed by the frequency divider 26 at a rate exactly 120 times the rate of pulses delivered to the real time counter for reasons which will become apparent as the description proceeds.

To compute an impulse forecast for the end of the billing period in progress, the forecast logic first generates, in response to manual or automatic interrogation, gating signals which transfer the count in the pulse counter 25 to the impulse forecast counter 27 and also transfers the contents of the real time counter 23 to the X 120 counter 24. At this instant, the impulse forecast counter 27 and the X 120 counter 24 contain counts identical to that of their associated counters which continue to accumulate counts in the normal manner. However, since the X 120 counter 24 is pulsed by the frequency divider 26, 120 times the rate that the real time counter 23 is pulsed, it will count toward 3,600 at the accelerated rate to simulate the "time to go" in the present billing period.

Simultaneously, impulses from the power monitor 2 are applied to up/down control logic 28 which permits up/down counter 29 to accumulate impulses. The count in up/down counter 29 is converted to an analog voltage by D/A converter 30, which analog voltage is applied through operational amplifier 31, to voltage controlled X 120 oscillator 32. The output of the X 120 oscillator 32, in addition to advancing the impulse forecast counter 27, inputs to divide-by-120 logic 43. The periodic output pulse from the divide-by-120 logic 43 enters the up/down control logic 28 to, in turn, reduce the count in up/down counter 29 by one. Thus, the net impulse count in the up/down counter 29 is adjusted to develop an analog voltage which causes the X 120 oscillator 32 to operate at precisely 120 times the rate of the impulses received from the power monitor 2.

These multiplied rate impulses are applied to the impulse forecast counter 27 to supplement the count transferred from the impulse counter 25, and accumulation continues in the impulse forecast counter 27 until the X 120 counter 24 reaches 3600 and issues a signal indicative of that state. The forecast logic 21 receives this "end of forecast" signal and immediately terminates the further accumulation of counts into the impulse forecast counter 27. The count is then transferred to the impulse holding register 33 for read out on the digital display 34. The count is also compared to set point numbers 1, 2 and 3 (as entered by switches 35, 36, and 37) by the set point coincidence logic 38. It may be noted here that set point number 2 is utilized as the control set point and is typically set just under the total number of impulses agreed upon between the power company and the user as the number which can be delivered during a billing period without penalty. For example, if 1,000 impulses are to be received during a thirty minute period, set point number 2 switches 36 might be set at 998. Set point number 3 is an additional threshold which may be used as an undercount threshold and set rather low. Set point number 1 is utilized to back up set point number 2 and is set slightly higher than set point number 2 in the eventuality that an interrogation is made toward the end of a period when set point number 2 has already been exceeded. If an overforecast condition is perceived by the set point coincidence logic 38, a signal is issued to the alarm circuit logic point 32 to sound an alarm and/or to make other appropriate responses.

When the forecast has been completed and is being displayed in the impulse forecast display 34, the next impulse from the power monitor 2 is utilized to shift the forecast logic 21 to the rate mode. In the rate mode, the X 120 counter 24 and the impulse counter 27 each start from a fully cleared position rather than with counts indicating accumulated actual time and actual impulses. When the X 120 counter 24 reaches a count of 3,600, it again issues an end forecast signal which halts impulses from the X 120 oscillator 22 into the impulse forecast counter 27 and transfers the contents of the rate holding register 39 are then transferred through the impulse-rate gates 40 for display for read out by the rate digital display 41. Alternatively, by means of impulse-rate display selector switch 42, the contents of the impulse counter 25 may be continually observed on the display 41. Thus, it will be understood that the forecast logic alternately institutes impulse and rate forecasts which are read out on the display 34 and 41 respectively. The necessity for providing for a rate display as well as an impulse forecast is dictated by rate limits which are placed on individual installations, and strictly speaking of course, "present rate" rather than a rate forecast is obtained in the rate mode.

It will be observed that several signals from the set point coincidence logic 38, the forecast logic 21, real time counter 23, the frequency divider 26, the period reset 20, the impulse counter 25, and the rate holding register 39 are provided to the incremental load controller 7 (FIG. 1). These signals are utilized by the incremental load controller 7 to make a determination of the effect of adding or shedding a predetermined load at a specific time.

Figure 3:
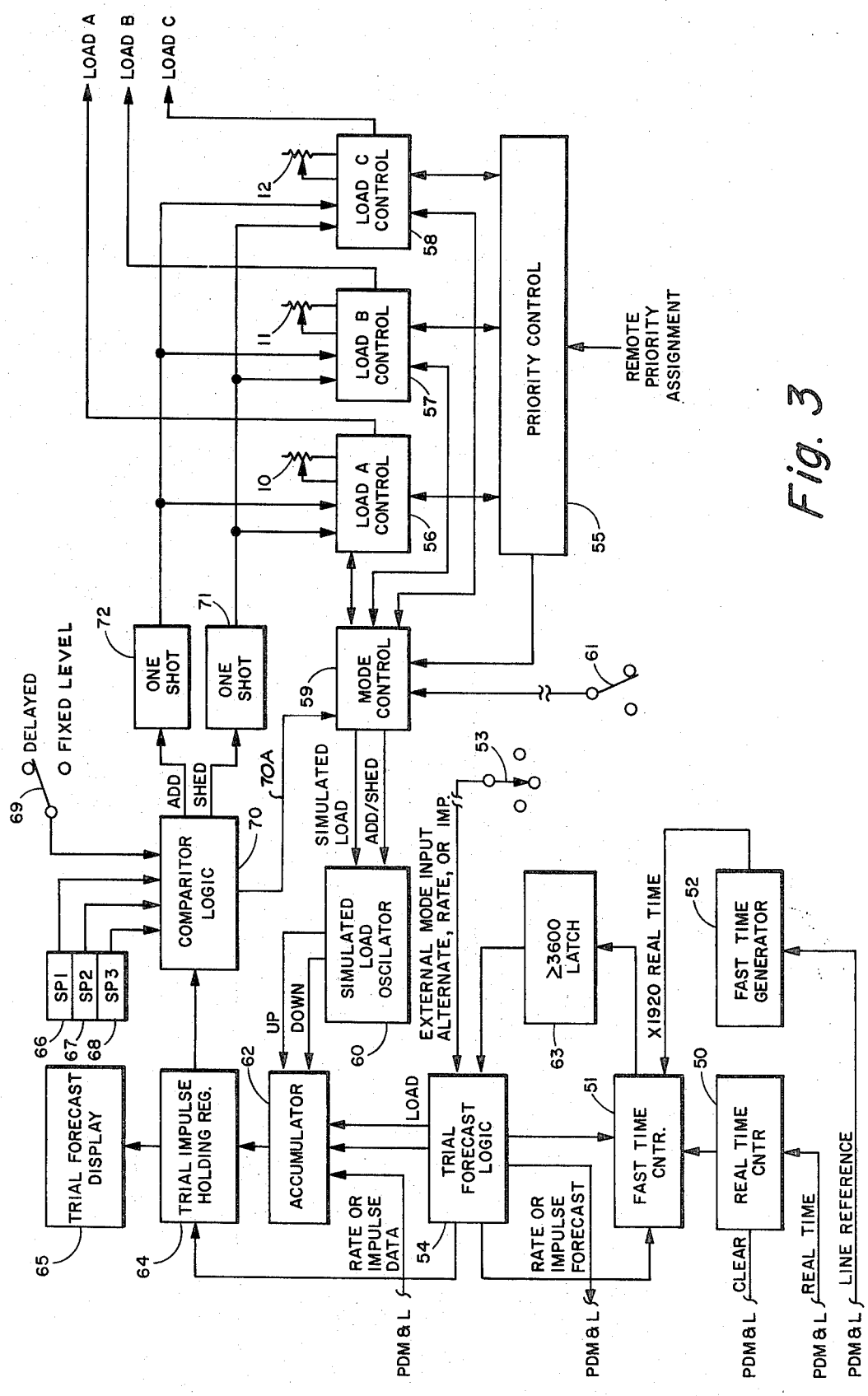
FIG. 3 is a block diagram of an incremental control unit constituting the principle area of the present invention.

Attention is now directed to FIG. 3 which is a block diagram of a typical incremental load controller 7. As will be explained in detail hereinafter, the controller 7 includes circuitry for making trial forecasts to simulate the effect of adding or shedding a load, and also includes circuitry for controlling the actual adding or shedding of loads. A real time counter 50 receives the same clear and advance pulses as the real time counter 23 in the PDM&L 6. However, a fast time counter 51 is impulsed 1920 times as fast as the real time counter 50 by clock pulses from a fast time generator 52 operating from the same timing signals which advance the X 120 counter 24 in the PDM&L.

The position of a manually controlled switch 53 determines whether the trial forecast logic 54 will operate in the rate mode, the impulse mode, or alternately between the two, and this information is also conveyed to the PDM&L to determine the information transferred from the PDM&L to the incremental controller. For simulation purposes, priority control logic 55 determines which one of the Load A control 56, Load B control 57, or Load C control 58 will next communicate through the mode control logic 59 with the simulated load oscillator 60. For load control purposes, priority control logic 55 monitors the status of Loads A, B and C, that is, which loads are on or off at any one time. These assignments are typically made remotely according to the requirements and physical configuration of the specific controlled system. The Load A control 56 is provided with Load A simulator 10, Load B control 57 is provided with load B simulator 11, and Load C control 58 (which is the $n^{th}$ in the example) is provided with Load C simulator 12, each of these simulators being precision variable resistors which affect the rate of oscillation of the simulator load oscillator 60 in accordance with their setting which is coordinated to the size of the represented load.

The operation of the simulator portion of incremental controller 7 can be understood by considering a manual mode of operation thereof. Information as to whether the next load is to be added or shedded is selected by a manual switch 61, and this information is conveyed to the simulated load oscillator to determine whether the output therefrom will cause the accumulator 62 to count up or down. Consider now that Load A, according to the priority scheme, is the next to add or shed and the apparatus has been set to function in the rate mode with the trial forecast to indicate the effect of shedding Load A at the time the forecast is made. Since the rate forecast has been selected, the trial forecast logic 54 issues a signal to the PDM&L 6 which transfers the contents of the rate holding register 39 into the accumulator 62 while simultaneously clearing the fast time counter 51 which thereupon commences to count up at a rate of 1920 times real time until a count of 3,600 is reached at which time a signal is issued to the latch circuit 63 which causes the trial forecast logic 54 to stop the impulses from the simulated load oscillator 60 from affecting the count in the accumulator 62. However, during the simulated demand interval before the fast time counter 51 reaches a count of 3,600, the accumulator 62 is counted down at a rate proportional to the size of Load A. The trial rate calculation is, therefore, an algebraic summation accomplished by rate counting for fixed time periods. The completed calculation is transferred to a trial impulse holding register 64 for read out on the trial forecast display 65. Similarly, if a rate forecast if desired to determine the effect of adding Load A, the switch 61 having been placed in the "add" position causes the output pulses from the simulated load oscillator 60 to count the accumulator 62 up rather than down to arrive at a trial forecast which is higher than the actual present rate transferred from the PDM&L 6 into the accumulator 62.

A trial impulse forecast, selected by the switch 53, commences with transfer of the count in the real time counter 50 to the fast time counter 51 inasmuch as it is the effect of adding or shedding a trial load for only the remainder of the base period that the trial forecast is directed to. Simultaneously, the PDM&L 6 is advised by the trial forecast logic 54 that an impulse forecast is being undertaken such that the count in the impulse counter 25 is transferred into the accumulator 62. The fast time counter 51 is then advanced at 1920 times real time while the simulated load oscillator counts up at a rate corresponding to the loads apparently remaining in operation including the simulated added or shedded load. When the fast time counter 51 reaches a count of 3600 to actuate the latch 63 and stop further incrementing of the accumulator 62, the contents of the accumulator 62 are transferred to the trial impulse holding register 64 for read out on the trial forecast display 65.

If switch 53 is set to the "alternate" position, the trial forecast logic 54 responds by issuing the necessary signals to alternately bring about rate and forecast signals each of which is presented in the display 65 for a predetermined time period.

The apparatus so far described provides an operator with periodic indications, at his selection, of trial forecasts based on rate or impulses or alternates of the two. It will be appreciated that a simple system configuration might consist of a single load which would obviate the necessity for the priority control 55 and associated elements. Consider now, however, a more advanced system including a plurality of loads, such as Load A, Load B and Load C, in which it is desired to not only observe the effect of adding or shedding a specific load at a specific time on the total energy consummation, but also to actually add or shed the load at an optimum time to approach the billing limit as closely as possible without exceeding it.

Still referring to FIG. 3, it will be observed that the ICU may also be provided with groups of set point switches 66, 67 and 68 which duplicate the switches 35, 36, and 37 in the PDM&L These set points correspond closely to the set points entered into the PDM&L, but are used for more than simply determining alarm conditions as will presently become apparent. In making a determination as to whether to add or shed a load, the ICU can function in either of two modes, fixed level or delayed, as selected by the switch 69 which sets up the comparator logic 70 accordingly.

In the fixed level mode, an impulse or rate forecast having just been completed by the PDM&L, the results are transferred to the trial forecast logic 54 and thence directly to the trial impulse holding register 64. These results are compared against set point one, as established by the switch 66. Assume that the conditions in the system are that Load A is the next to be shed and a forecast is carried out by the PDM&L. In the fixed level decision making mode, the forecast is compared against set point one and, if the forecast equals or exceeds set point one, a shed command is generated to a first delay one shot 71. As a result, one shot 71 issues a shed signal to the controls 56, 57 and 58. Because priority control 55 has determined that Load A is on and has the lowest priority, Load A control 56 responds to the shed signal to transmit the necessary signals to actually shed Load A. The one shot 71 is typically configures to give a rather long delay (on the order of 30 seconds) to account for the inertia in handling the heavy loads contemplated and blocks additional shed commands until after its delay period.

Similarly, assuming that the system is set up to add Load A next, the comparator logic 70 examines the forecast made by the PDM&L which is stored in the trial impulse holding register 64 and issues an add command to the one shot 72 if the forecast is lower than the value established by the set point one switches 66. As a result, the one shot 72, like the one shot 71 issues an add signal to the Load A control 56 which responds by generating the necessary signals to effect the addition of Load A to the system.

It will be recognized that in the fixed level mode, the simulator portion of the ICU is inoperative and decisions as to adding or shedding loads are made solely on the basis of the forecasts generated by the PDM&L and the setting of the set point one.

If, on the other hand, the switch 69 is in the "delayed" position, the simulator portion of the ICU is used to make trial forecasts, in the manner previously described. However, the forecasts are made automatically under control of comparator logic 50, and switch 61 is inoperative.

As with the fixed level mode of operation, the forecast data from the PDM&L is compared with set point one, as established by switch 66. If the forecast is over set point one, comparator logic 70 issues a simulate shed signal to mode control 59 on line 70A. If the forecast is below set point one, comparator logic 70 issues a simulate add signal on line 70A. As a result, mode control 59 causes a trial forecast to be made for the next load to be added or shed. This forecast is made in a manner identical to that previously described for the simulator under control of switch 61, with the exception that the add/shed information is obtained from the simulate add/simulate shed signals on line 70A.

For example, let it be assumed that the forecast made by the PDM&L is greater than set point one. As a result, comparator logic 70 issues a simulate shed signal on line 70A to mode control 59. If priority control 55 designates that Load A is the next to be shed, load control 59 issues a shed signal to simulated load oscillator 60, together with a simulated load signal proportional to the size of Load A. The trial forecast is then made in the manner previously described, so that at the end of the computation period, the trial impulse holding register 64 contains a trial forecast showing the effect of shedding Load A from the system.

This trial forecast is then supplied to comparator logic 70, where it is compared against set point two, established by a switch 67. Set point two is utilized as a control set point to generate a shed command signal in the delayed mode. If the trial forecast equals or exceeds set point two, comparator logic issues a shed command signal to one shot 71. As a result, Load A control 56 issues appropriate signals to actually shed Load A. If the trial forecast is less than set point two, no shed command signal is issued. The cycle of making a trial forecast showing the effect of shedding Load A from the system is then repeated until such a time that the forecast is equal to or greater than set point two.

If the PDM&L forecast is less than set point one, comparator logic 70 issues a simulate add signal on line 70A to mode control 59. Assuming that Load A is the next to add, a trial forecast is than made, showing no effect of adding Load A to the system The trial forecast is then supplied to comparator logic 70, where it is compared against set point three, established by a switch 68. Set point three is utilized as a control set point to generate an add command signal in the delayed mode. If the trial forecast is equal to or less than set point three, comparator issues an add command signal to one shot 72. As a result, the next load to add, as established by priority control 55, responds to the add signal issued by one shot 72, and causes that load to be actually added. If, however, the trial forecast is greater than set point three, the cycle of making a trial forecast and comparing that trial forecast against the set points three is repeated.

Therefore, in the delayed mode of operation, the add or shed command signals are not issued to the one shot 72 or 71 until the difference between the trial forecast and the set points two or three is very slight or zero. That is, loads are not shed until it is mandatory to do so to avoid an over-punch at the end of the demand interval; and loads are not added until it is determined that the effect of adding will not cause an over-count condition at the end of the demand interval. This ability to optimally time the adding or shedding the load prevents load cycling and contributes to smooth plant operation.

Figure 4:
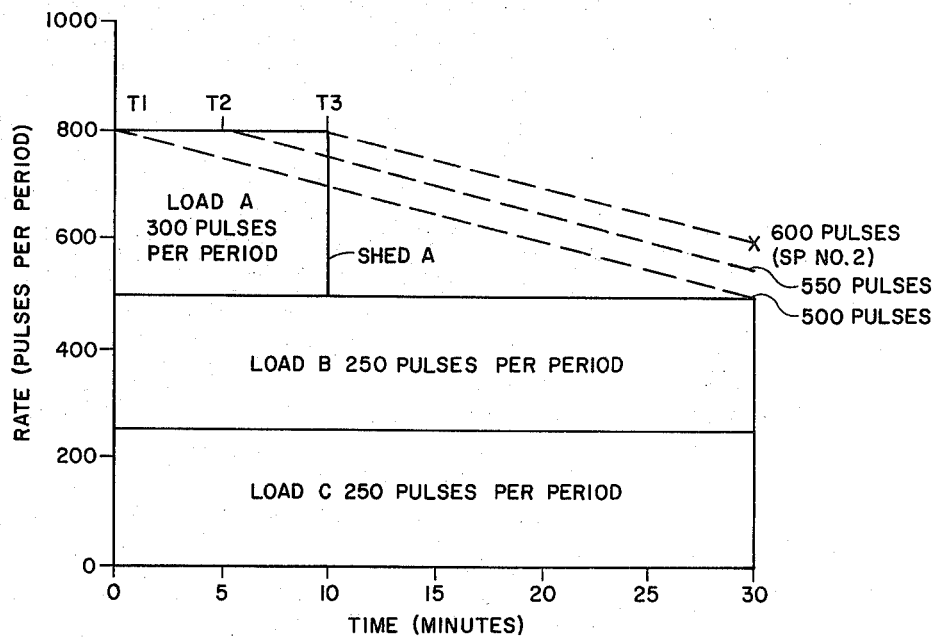
FIG. 4 is a time/energy graph illustrating the effect of shedding a load at various times.
Figure 5:
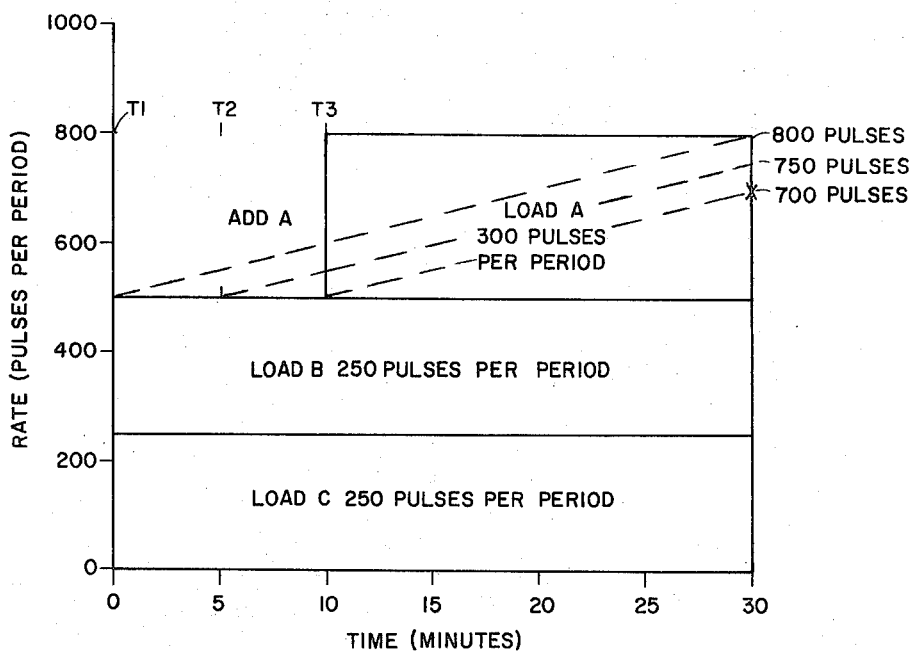
FIG. 5 is a similar time/energy graph illustrating the effect of adding a load at various times.

Examples of the manner in which shed and add commands, issued by the ICU in conjunction with a plurality of trial forecasts, may be utilized to expend an optimum amount of energy are illustrated in FIGS. 4 and 5. Referring in partic-lar to FIG. 4, assume a system having three loads, Load A, Load B and Load C, rated respectively at 300 pulses per period, 250 pulses per period and 250 pulses per period. The billing period is 30 minutes and the agreed upon energy expenditure allowed without penalty is 600 total pulses. Therefore, both set points one and two are set at 600 pulses.

The period commences with all three loads on line and Load A is designated by priority control 55 as the next to shed. A comparison of the impulse forecast made by the PDM&L with set point one in comparator logic 70 causes a simulate shed signal to be issued to mode control 59 on line 70A. As a result, a trial forecast is made to determine the effect of shedding Load A at that point, or time $T_1$. The trial forecast made at $T_1$ gives a projected total of 500 pulses for the period. Since this total is under set point two, no shed command signal is issued. A trial forecast made at time $T_2$ indicates 550 pulses for the period. When the trial forecast is equal to or greater than set point two, that is, at time $T_3$, a shed command signal is issued by comparator logic 70. As a result, one shot 71 issues a shed signal to all controllers 56, 57 and 58. Because of the setting of priority logic 55, Load A is actually shed at this time.

Thus, for the first ten minutes of the period, the pulse rate is 800 pulses per period while for the remaining twenty minutes the rate if 500 pulses per period. It may be noted that Load A could have been shed at anytime before $T_3$, but if it had been shed earlier, the trial forecast succeeding the earlier shedding would have been below 600 pulses, indicating the necessity to add Load A back in. By delaying the shedding of Load A until $T_3$, such cycling of Load A is avoided.

Now referring to FIG. 5, assume the same system in which the agreed upon energy expenditure allowed without penalty is 700 total pulses. Accordingly, both set points one and set points three are set at 700 pulses. If the billing period commences with only Loads B and C on line, the forecast made by the PDM&L at the beginning of the period is 500 total pulses. Since this is less than set point one, comparator logic 70 issues a simulate add signal on line 70A to mode control 59. Since Load A is of course designated as the next to add by priority control logic 55, a trial forecast is made, simulating the addition of Load A. A forecast taken at time $T_1$ indicates 800 pulses for the period. Since this total exceeds set point three, no add command signal is issued by comparator logic 70 and the forecast cycle is repeated. A forecast taken at time $T_2$ indicates a projected total consumption of 750 pulses. However, a forecast taken at $T_3$ indicates a projected total consumption of 700 pulses. Since this is equal to the setting of set point three, an add command signal is issued by comparator logic 70 to one shot 72, which then causes Load A to be added in the manner previously described. Again, Load A could have been added earlier, but subsequent forecasts would indicate the necessity for shedding Load A, and by delaying the adding action until time $T_3$, cycling is prevented.

We claim:

1. In a system for determining the total power consumption of an electrical load during a predetermined demand interval, which system includes means for recording the total time consumed to a selected time during the demand interval, the total electrical energy consumed during the corresponding time period, and the actual rate of electrical energy consumption at the selected time; means for forecasting the total energy consumption during the demand interval comprising:
 a. means for simulating the time remaining in the demand interval at an accelerated rate;
 b. means for developing simulated impulses representative of the rate at which power will be consumed during said time remaining of the demand interval, which simulated impulses are developed at said accelerated rate and
 c. means for accumulating said simulated impulses, the accumulated total of said simulated impulses during said accelerated time remaining in the demand interval being representative of the energy consumption during the remainder of the demand interval; and
 d. means for recording the algebraic sum of said accumulated total of said simulated pulses and the total electrical energy consumed during said corresponding time period, said algebraic sum being representative of the forecast energy consumption for the entire demand interval.

2. The system of claim 1 including a rate modifier, in which said simulated pulses represent the algebraic sum of said actual rate and said rate modifier simulating the effect of adding or shedding a load portion.

3. The system of claim 2 in which said simulated pulses are developed in a simulated load oscillator functioning at a rate determined by the total simulated load, said simulated pulses accumulating for the accelerated simulated remainder of the demand interval.

4. The system of claim 3 in which said accumulating means is an accumulator, said system further including means for transferring the recorded energy actually consumed to the selected time and means for incrementing said accumulator with said simulated pulses for the accelerated simulated remainder of the demand interval.

5. The system of claim 4 which further includes means for digitally displaying the total count in said accumulator at the end of the simulated remainder of the demand interval.

6. The system of claim 4 which further includes means for entering a predetermined count representing the total energy consumption desired for the demand period; means for comparing said predetermined count to the total count in said accumulator at the end of the simulated remainder of the demand interval; and means for providing an indication of the quantitative relationship between the predetermined count and the count in the accumulator.

7. The system of claim 6 which further includes means responsive to the polarity of the difference between the predetermined count and the count in the accumulator at the end of a simulation for issuing a command to alter the rate of energy consumption.

8. The system of claim 7 in which means are provided to inhibit alteration of the rate of energy consumption until the magnitude of the difference between the predetermined count and the count in the accumulator at the end of a simulation falls within predetermined limits.

9. A system for forecasting the total power consumption by an electrical load during a demand interval comprising:
 a. means for simulating the total time of the predetermined demand interval at an accelerated rate by compressing said demand interval;
 b. means for developing simulated pulses representative of the rate at which power will be consumed if the electrical load is altered, which simulated impulses are developed at said accelerated rate in said compressed demand interval; and
 c. means for accumulating said simulated pulses during said compressed demand interval, resulting in an accumulated total, which accumulated total is representative of the forecast energy consumption for the demand interval.

10. A system in accordance with claim 9, including means for recording said accumulated total representative of the forecast energy consumption for the demand interval.

11. A system in accordance with claim 10, including means for digitally displaying the recorded forecast energy consumption for the demand interval.

* * * * *